US011328098B2

United States Patent
Marinet

(10) Patent No.: US 11,328,098 B2
(45) Date of Patent: May 10, 2022

(54) ELECTRONIC CIRCUIT

(71) Applicant: STMICROELECTRONICS (ROUSSET) SAS, Rousset (FR)

(72) Inventor: Fabrice Marinet, Chateauneuf le Rouge (FR)

(73) Assignee: STMICROELECTRONICS (ROUSSET) SAS, Rousset (FR)

(*) Notice: Subject to any disclaimer, the term of this patent is extended or adjusted under 35 U.S.C. 154(b) by 39 days.

(21) Appl. No.: 16/894,523

(22) Filed: Jun. 5, 2020

(65) Prior Publication Data

US 2020/0394337 A1 Dec. 17, 2020

(30) Foreign Application Priority Data

Jun. 11, 2019 (FR) ...................... 1906185

(51) Int. Cl.
*H04L 9/06* (2006.01)
*G06F 21/72* (2013.01)
*G06F 9/448* (2018.01)
*B41J 2/175* (2006.01)

(52) U.S. Cl.
CPC .......... *G06F 21/72* (2013.01); *B41J 2/17546* (2013.01); *G06F 9/4498* (2018.02); *H04L 9/0631* (2013.01)

(58) Field of Classification Search
CPC . G11C 2029/4402; G11C 29/08; G11C 29/16; G11C 29/26; G11C 29/38; G11C 2029/0409; G11C 7/24; H04L 9/0631; H04L 2209/26; G06F 21/72; G06F 9/4498; G06F 21/79
See application file for complete search history.

(56) References Cited

U.S. PATENT DOCUMENTS

| | | | |
|---|---|---|---|
| 2002/0037081 A1* | 3/2002 | Rogoff | H04N 7/165 380/278 |
| 2002/0141589 A1* | 10/2002 | Garay | H04L 9/0827 380/277 |
| 2007/0172053 A1 | 7/2007 | Poirier | |
| 2012/0030443 A1 | 2/2012 | Wuidart | |
| 2012/0066571 A1 | 3/2012 | Marinet | |
| 2013/0169992 A1* | 7/2013 | Panshin | G06K 15/4095 358/1.14 |
| 2015/0071434 A1* | 3/2015 | Thacker, III | G06F 21/72 380/30 |
| 2019/0163909 A1 | 5/2019 | Schilder et al. | |

FOREIGN PATENT DOCUMENTS

WO 02/082241 A1 10/2002

OTHER PUBLICATIONS

"Reverse Engineering AES Keys from Unreal Engine 4 Projects"—Jamie Holding https://blog.jamie.holdings/2019/03/23/reverse-engineering-aes-keys-from-unreal-engine-4-projects/ (Year: 2019).*
"Reverse Engineering a Printer Cartridge Chip"—Reverse Engineering. StackExchange https://reverseengineering.stackexchange.com/questions/12795/reverse-engineering-a-printer-cartridge-chip (Year: 2016).*

* cited by examiner

*Primary Examiner* — Randy A Scott
(74) *Attorney, Agent, or Firm* — Seed IP Law Group LLP

(57) ABSTRACT

An electronic circuit includes an interface, a read-only memory in which encrypted data are stored, and cryptographic circuitry coupled to the interface. In operation, the cryptographic circuitry uses a decryption key received via the interface to decrypt the encrypted data. The electronic circuit performs one or more operations using the decrypted data.

17 Claims, 2 Drawing Sheets

ELECTRONIC CIRCUIT

BACKGROUND

Technical Field

The present disclosure relates generally to electronic circuits and devices, and more particularly to the protection of these circuits and devices. The present description applies more specifically to the protection of electronic circuits and devices against techniques of the reverse engineering type that may lead to malevolent acts.

Description of the Related Art

Electronic circuits and devices may experience different types of attacks. These attacks may aim to recover data stored in a circuit or in a device, and/or to alter the operation of a circuit or a device.

Different techniques are used by an attacker to carry out these attacks, one of which is reverse engineering. Reverse engineering consists of studying an object to determine its internal working and/or how it is manufactured. In the case of a circuit or an electronic device, a reverse engineering technique may consist of the partial or complete study of the components and their arrangement in the circuit or the device. From this study, an attacker may for example develop a model making it possible to simulate the operation of the circuit or the device.

BRIEF SUMMARY

There is a need in the art for protection against techniques of the reverse engineering type that are more reliable and more effective.

One embodiment facilitates addressing all or some of the drawbacks of known protection against reverse engineering techniques.

One embodiment provides a device in which data stored in a read-only memory is not decipherable.

One embodiment provides an electronic circuit incorporating a read-only memory in which encrypted data are stored, the decryption key not being present in said circuit.

Another embodiment provides a method for decrypting data of an electronic circuit, stored in a read-only memory, in which the data are decrypted using a decryption key that is not present in said circuit.

According to one embodiment, the circuit incorporates a finite-state machine.

According to one embodiment, the decryption key is supplied to the finite-state machine.

According to one embodiment, the encryption key is supplied to the finite-state machine during an activation phase.

According to one embodiment, the data are decrypted by the finite-state machine.

According to one embodiment, the data are decrypted each time the data are used.

According to one embodiment, the circuit further incorporates a non-volatile memory.

According to one embodiment, the circuit further incorporates a volatile memory.

According to one embodiment, the data are stored in the volatile memory.

According to one embodiment, the data are stored in the volatile memory before being stored in the non-volatile memory.

According to one embodiment, the data are encrypted by an algorithm of the "Advanced Encryption Standard" type.

In an embodiment, an electronic circuit comprises an interface, which, in operation, receives a decryption key; a read-only memory in which encrypted data are stored; and cryptographic circuitry coupled to the interface. In operation, the cryptographic circuitry uses the decryption key received via the interface to decrypt the encrypted data. The electronic circuit performs one or more operations using the decrypted data. In an embodiment, the cryptographic circuitry comprises a finite-state machine. In an embodiment, the decryption key is supplied to the finite-state machine via the interface. In an embodiment, the decryption key is supplied to the finite-state machine during an activation phase. In an embodiment, the data are decrypted by the finite-state machine. In an embodiment, the electronic circuit comprises a non-volatile memory. In an embodiment, the electronic circuit comprises a volatile memory. In an embodiment, the cryptographic circuitry, in operation, stores the decrypted data in the volatile memory. In an embodiment, the electronic circuit comprises a non-volatile memory, wherein the data are stored in the volatile memory before being stored in the non-volatile memory. In an embodiment, the data are encrypted by an algorithm of the "Advanced Encryption Standard" (AES) type. In an embodiment, the electronic circuit comprises one or more processing cores, wherein the one or more operations include a start-up operation of the one or more processing cores.

In an embodiment, a method comprises: receiving, by an electronic device, a decryption key via an interface of the electronic device; decrypting, using the decryption key, encrypted data stored in a read-only memory of the electronic device; and performing, by the electronic device, one or more operations using the decrypted data, wherein the decryption key is not stored in the electronic device prior to receipt of the decryption key via the interface. In an embodiment, the method comprises receiving the decryption key during an activation phase of the electronic device. In an embodiment, the method comprises storing the decrypted data in a volatile memory of the electronic device. In an embodiment, the one or more operations include a start-up operation of the electronic device. In an embodiment, the method comprises: coupling, via the interface, the electronic device to another electronic device; and receiving the decryption key via the interface from the another electronic device, wherein the one or more operations comprise authenticating a compatibility of the electronic device and the another electronic device.

In an embodiment, a system comprises: a first electronic device; and a second electronic device coupled to the first electronic device, the second electronic device including: a read-only memory in which encrypted data are stored; and cryptographic circuitry coupled to the read-only memory, which, in operation, uses a decryption key received from the first electronic device to decrypt the encrypted data, wherein, in operation, the second electronic device performs one or more operations using the decrypted data. In an embodiment, the first electronic device, in operation, provides the decryption key to the second electronic device during an activation phase of the second electronic device. In an embodiment, the one or more operations comprise authenticating a compatibility of the first and second electronic devices. In an embodiment, the first electronic device is a printer and the second electronic device is a printer cartridge.

BRIEF DESCRIPTION OF THE SEVERAL VIEWS OF THE DRAWINGS

The foregoing features and advantages, as well as others, will be described in detail in the following description of specific embodiments given by way of illustration and not limitation with reference to the accompanying drawings, in which.

DETAILED DESCRIPTION

Like features have been designated by like references in the various figures. In particular, the structural and/or functional features that are common among the various embodiments may have the same references and may dispose identical structural, dimensional and material properties.

For the sake of clarity, only the operations and elements that are useful for an understanding of the embodiments described herein have been illustrated and described in detail.

In particular, the complete cryptography algorithms using encryption and/or decryption keys will not be described in detail, the described embodiments applying to the usual algorithms.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

Figure 1:
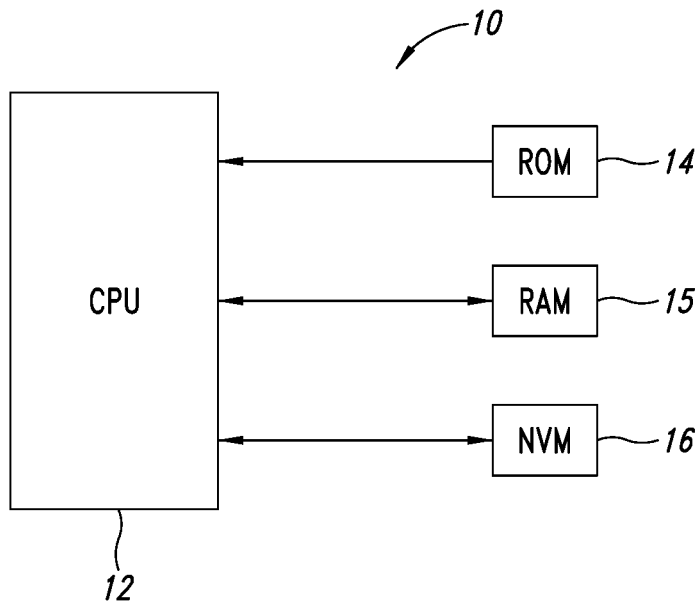
FIG. 1 shows, in block form and very schematically, an example of an electronic device sensitive to reverse engineering techniques.

FIG. 1 is a very schematic view, in block form, of an exemplary electronic circuit 10 sensitive to certain reverse engineering techniques. The circuit 10 is, for example, a microcontroller.

The electronic circuit 10 is equipped with at least one processor 12 (CPU) configured to process data stored in memories.

The circuit 10 further comprises at least one read-only memory 14 (ROM), at least one random-access memory 15 (RAM), and at least one non-volatile memory 16 (NVM).

The read-only memory 14 is a memory in which data are written a single time and can be read several times. More particularly, the read-only memory 14 is a memory in which data are hardcoded, that is to say, a memory in which data are fixed by manufacturing, for example by conductive tracks, or by unalterable doped regions. The data of the read-only memory 14 are therefore kept while the circuit 10 is powered on or off. A read-only memory of the read-only memory 14 type generally facilitates storing:

data relative to the startup of the circuit (e.g., data or instruction used or executed as part of a boot process);

data making it possible to perform tests of the circuit, for example tests to be performed during its manufacture, or tests making it possible to diagnose the origin of malfunctions, and/or errors during use;

data making it possible to authenticate the circuit or another circuit; and/or data regarding the startup of certain functions of the circuit 10.

Hardcoded data are data that are particularly sensitive to reverse engineering techniques. Indeed, a study of the electronic components of a read-only memory and their arrangement may suffice to read hardcoded data.

The volatile memory 15 is a memory in which data are stored electrically, and are not kept during a phase where the circuit 10 is powered off. This is a memory storing data useful only during the operation of the circuit 10. The volatile memory 15 is for example a memory of the "random-access memory" (RAM) type.

The nonvolatile memory 16 is a memory in which the data are stored electrically and which is able to keep these data during phases where the circuit 10 is powered off. This is a memory storing data able to be written during a use of the memory and able to be useful during several successive uses of the circuit 10.

When the data processed by the circuit 10 are considered to be sensitive, the data stored in the memories 14, 15, 16 can be, and may be encrypted. These data are, for example, encrypted by one or several different cryptographic algorithms, using encryption and/or decryption keys. The encryption and/or decryption keys making it possible to encrypt and/or decrypt the data of the memories are also generally stored in the memories 14, 15 and/or 16, in connected registers, and/or in a digital part of the circuit 10. More particularly, the key making it possible to decrypt the data stored in the read-only memory 14 is generally stored in a digital part of the circuit. Indeed, the data stored in the read-only memory generally being data used by the circuit 10 in order to start, the decryption key associated therewith must be accessible upon powering on the circuit 10, and is therefore hardcoded in the circuit. One drawback of this is that a pirate can, using a reverse engineering technique, have access to the encrypted data stored in the read-only memory 14 as well as their decryption key. Thus, a pirate can succeed in decrypting and reading hardcoded data. Furthermore, by using these data, a pirate can for example take control of the processor 12, and divert the use thereof, for example, in order to access data stored in other memories of the circuit 10, for example the volatile 15 and non-volatile 16 memories.

Figure 2:
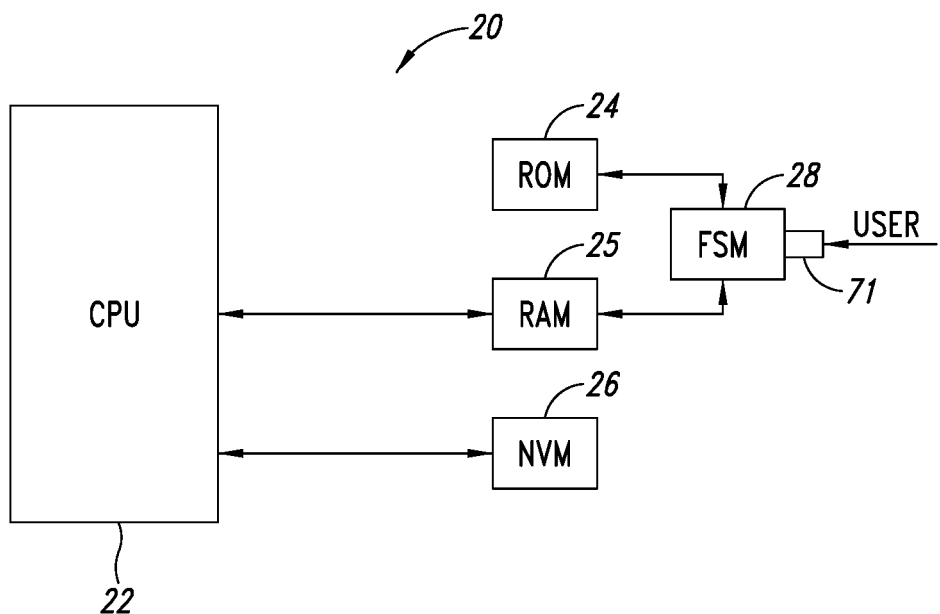
FIG. 2 shows, in block form and very schematically, an embodiment of an electronic device.

FIG. 2 is a very schematic view, in block form, of one embodiment of an electronic circuit 20. The electronic circuit 20 is, for example, a microcontroller. One practical exemplary application of the electronic circuit 20 is described in relation with FIG. 4.

The electronic circuit 20 is equipped with at least one processor 22 (CPU) (e.g., one or more processing cores, processing circuitry, etc., and various combinations thereof) configured to process data stored in memories.

The circuit 20 further comprises at least one read-only memory 24 (ROM), at least one random-access memory 25 (RAM), and at least one non-volatile memory 26 (NVM).

The read-only memory 24 is a read-only memory of the type of the read-only memory 14 of the circuit 10 described in relation with FIG. 1. According to one embodiment, the read-only memory 24 only stores necessary data during the powering on of the circuit 20. As an example, the read-only memory 24 for example only stores data relative to the starting up of the circuit 20, and data making it possible to authenticate the circuit 20. One advantage is that the read-only memory 24 can, in practice, be much smaller than the read-only memory 14.

The volatile memory 25 is a volatile memory of the type of the volatile memory 15 of the circuit 10 described in relation with FIG. 1.

The non-volatile memory 26 is a non-volatile memory of the type of the non-volatile memory 16 of the circuit 10 described in relation with FIG. 1.

As described in relation with FIG. 1, the data stored in the memories 24, 25 and 26 may be encrypted by one or several different encryption, or cryptography, algorithms, using encryption and decryption keys. According to one embodiment, the encrypted data stored in the read-only memory 24 are encrypted by a strong encryption algorithm. As an example, the encryption algorithm is an algorithm of the "Advanced Encryption Standard" (AES) type.

According to one embodiment, the decryption key of the encrypted data stored in the read-only memory 24 of the circuit 20 is not stored in the circuit 20, and more particularly, is not stored in any of the memories 24, 25 and 26, or in the digital part of the circuit 20. Moreover, in an embodiment the data allowing the generation of the decryption key, or "generation data", is also not stored in the circuit 20, and more particular, is not stored in any of the memories 24, 25 and 26, or in the digital part of the circuit 20. Thus, a pirate, using reverse engineering techniques, can only access encrypted data stored in the read-only memory 24, e.g., encrypted strongly without having access to the key making it possible to decrypt them.

According to one embodiment, the circuit 20 further incorporates at least one finite-state machine 28 (FSM), which may comprise, for example, logic circuits, processing cores, cryptographic circuits, etc., and various combinations thereof. The finite state machine 28 is suitable for receiving data coming from the read-only memory 24, and data coming from a user (USER). The finite state machine 28 is suitable for writing data in the volatile memory 25 and/or in the non-volatile memory 26. The finite state machine 28 is further suitable for performing data decoding operations. More particularly, the finite state machine 28 is suitable for decrypting, once the decryption key has been supplied to it, the encrypted data stored in the read-only memory 24. As an example, the finite state machine 28 is suitable for decrypting data encrypted with an encryption key of the AES type.

The operation of the circuit 20 is as follows. The circuit 20 comprises two distinct life phases. A first phase is the manufacturing and testing phase of the circuit 20, and a second phase is the activity phase of the circuit 20, for example at a user. The first phase ends with a testing and activation phase, or activation step, described hereinafter.

During the manufacturing phase, the startup program data of the circuit 20 are stored in the read-only memory 24 and are encrypted by a strong encryption algorithm. The decryption key not being present in the memories 24, 25 and 26 of the circuit 20, the circuit 20 cannot start, since the processor does not have access to encrypted data making it possible to implement a startup program.

The manufacturing phase ends with the activation step of the circuit 20. During this step, a user supplies the circuit 20 with the decryption key for the encrypted data stored in the read-only memory 24. More particularly, the user supplies the finite state machine 28 with the decryption key, for example, via an interface 71. The finite state machine 28 uses the received decryption key to decode all or part of the encrypted data stored in the read-only memory 24, which, in an embodiment, may include all of the data of the read-only memory 24. Next, the finite state machine 28 stores the decrypted data in the volatile memory 25. The circuit 20 can then start by using the data stored in the volatile memory 25.

According to an embodiment variant, once the decryption of the encrypted data stored in the read-only memory 24 is done, the finite state machine 28 can further carry out a test making it possible to verify whether the encrypted data has been decrypted correctly. An exemplary test can be as follows. The finite state machine 28 can for example verify whether a datum, for example, decrypted at the end of a data packet, is correct relative to a test datum. If this value is correct, then the finite state machine 28 can write the decrypted data in the volatile memory 25 or in the nonvolatile memory 26. If the value is incorrect, then the values are not written in the volatile memory 25 or in the nonvolatile memory 26. If data have not been correctly decrypted, this may mean that the decryption key supplied by the user is not correct.

During the activity phase, the circuit 20 starts owing to the data present in the volatile memory 25 or in the nonvolatile memory 26. The read-only memory is then no longer used by the circuit 20.

In one embodiment, each time the circuit 20 is powered on, the processor 22 can perform a test to determine whether the activation step has already taken place. More particularly, this test can make it possible to determine the memory in which the processor 22 must look for the startup and/or authentication data, that is to say, in the read-only memory 24 or the non-volatile memory 26. This test can for example comprise looking for specific information written in the nonvolatile memory 26.

One advantage of the embodiment described in relation with FIG. 2 is that the encrypted data stored in the read-only memory 24 are protected by a strong encryption algorithm, and the key making it possible to decrypt them is not stored in the circuit 20.

Another advantage of this embodiment is that the startup and/or authentication data, necessary for the circuit 20 each time it is powered on, are stored electrically in the non-volatile memory 26. The startup and/or authentication data are therefore not accessible and the circuit 20 cannot start. An electrical data storage is less sensitive to reverse engineering techniques than hard data storage.

Figure 3:
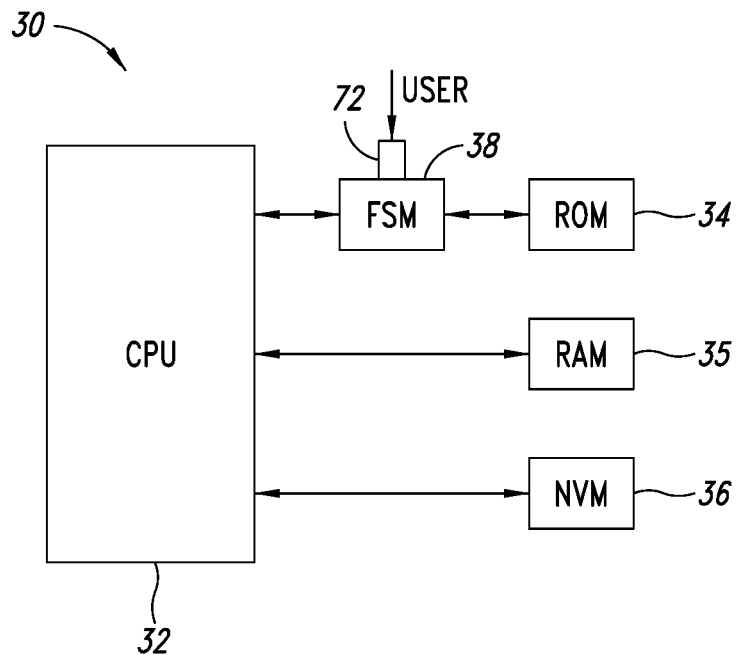
FIG. 3 shows, in block form and very schematically, another embodiment of an electronic device.

FIG. 3 is a very schematic view, in block form, of another embodiment of an electronic circuit 30. Like the electronic circuit 20 described in relation with FIG. 2, the electronic circuit 30 is, for example, a microcontroller. One practical exemplary application of the electronic circuit 30 will be described in relation with FIG. 4.

The electronic circuit 30 is equipped with at least one processor 32 (CPU) (e.g., logic circuits, one or more processor cores, etc.) configured to process data stored in memories.

The circuit 30 further comprises at least one read-only memory 34 (ROM), at least one random-access memory 35 (RAM), and at least one non-volatile memory 36 (NVM).

The read-only memory 34 is a read-only memory of the type of the read-only memories 14 and 24 of the circuits 10 and 20 described in relation with FIGS. 1 and 2. According to one embodiment, like the read-only memory 24, the read-only memory 34 only stores data used during the powering on of the circuit 30.

The volatile memory 35 is a volatile memory of the type of the volatile memories 15 and 25 of the circuits 10 and 20 described in relation with FIGS. 1 and 2.

The non-volatile memory 36 is a non-volatile memory of the type of the non-volatile memories 16 and 26 of the circuits 10 and 20 described in relation with FIGS. 1 and 2.

As described in relation with FIGS. 1 and 2, the data stored in the memories 34, 35 and 36 may be encrypted by one or several different encryption algorithms. According to one embodiment, the data stored in the read-only memory 34 are encrypted by a strong encryption algorithm. As an example, the encryption algorithm is an algorithm of the "Advanced Encryption Standard" (AES) type.

According to one embodiment, the decryption key of the data stored in the read-only memory 34 of the circuit 30 is not stored in the circuit 30, and more particularly, is not stored in any of the memories 34, 35 and 36, or in a digital part of the circuit 30. Moreover, in an embodiment the data allowing the generation of the decryption key, or "generation data", is also not stored in the circuit 30, and more particular is not stored in any of the memories 34, 35 and 36, or in the digital part of the circuit 30. Thus, a pirate, using reverse engineering techniques, can only access data stored in the read-only memory 34, encrypted by a strong encryption algorithm, without having access to the key making it possible to decrypt them.

According to one embodiment, the circuit 30 further incorporates at least one finite-state machine 38 (FSM), which may comprise, for example, logic circuits, processing cores, cryptographic circuits, etc., and various combinations thereof. The finite state machine 38 is suitable for receiving data coming from the read-only memory 34, and data coming from a user (USER). The finite state machine 38 is suitable for supplying data to the processor 32. The finite state machine is further suitable for performing data decryption operations. More particularly, the finite state machine 38 is suitable for decrypting, once the decryption key has been supplied to it, the data stored in the read-only memory 34. As an example, the finite state machine 38 is suitable for decrypting data encrypted with an encryption key of the AES type.

The operation of the circuit 30 is as follows. The circuit 30 comprises two distinct life phases. A first phase is the manufacturing phase of the circuit 30, and a second phase is the activity phase of the circuit 30, for example at a user. The first phase ends with a testing and activation phase, or activation step, described hereinafter.

During the manufacturing phase, the startup program data of the circuit 30 are stored in the read-only memory 34 and may be strongly encrypted. The decryption key not being present in the memories 34, 35 and 36 of the circuit 30, or in a digital part of the circuit 30, the circuit 30 cannot start, since the processor does not have access to encrypted data making it possible to implement a startup program.

The manufacturing phase ends with the activation step of the circuit 30. During this step, a user supplies the circuit 30 with the decryption key for the data stored in the read-only memory 34. More particularly, the user supplies the finite state machine 38 with the decryption key, for example, via an interface 72. The finite state machine 38 uses the received decryption key to decrypt all or part of the data stored in the read-only memory 34. As an example, the finite state machine 38 decrypts the data stored in the read-only memory each time the processor 32 needs it.

According to an embodiment variant, before the decryption of the encrypted data stored in the read-only memory 34, the finite state machine 38 can further carry out a test making it possible to verify whether the encrypted data are decrypted correctly. An exemplary test can be as follows. The finite state machine 38 can for example verify whether a decrypted datum is correct relative to a reference datum. If this value is correct, then the finite state machine 38 is authorized to decrypt the data requested by the processor 32. If the value is incorrect, this may mean that the decryption key supplied by the user is not correct. The finite state machine 38 for example remains in an off state until the next reset or until the next restart of the circuit 30.

During the activity phase, the circuit 30 restarts owing to the data present in the read-only memory 34 once they are decrypted by the finite state machine 38.

In one embodiment, each time the circuit 30 is powered on, the processor 32 performs a test to determine whether the activation step has already taken place. More particularly, this test makes it possible to determine the memory in which the processor 32 must look for the startup and/or authentication data. This test can for example comprise looking for specific information written in the nonvolatile memory 36.

The advantages of the embodiment described in relation with FIG. 3 are the same as the advantages of the embodiment described in relation with FIG. 2.

Figure 4:
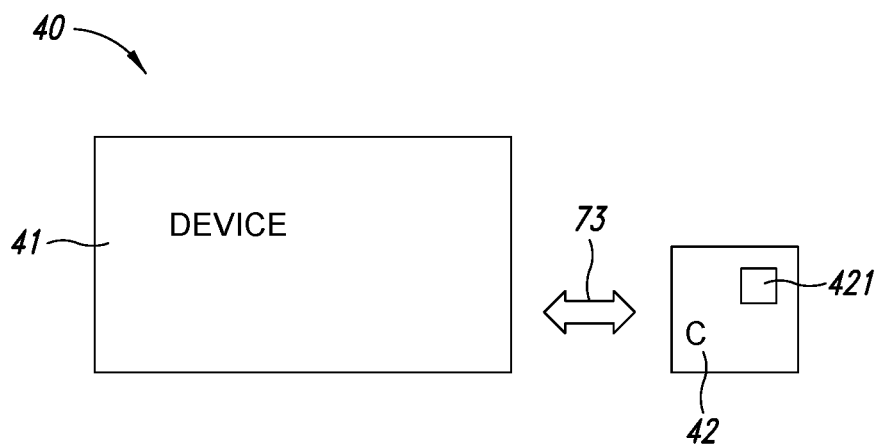
FIG. 4 shows a schematic view of an exemplary application of the embodiments described in relation with FIGS. 2 and 3.

FIG. 4 is a schematic view of an exemplary application of the embodiments described in relation with FIGS. 2 and 3. FIG. 4 more particularly illustrates a system 40 made up of a device 41 and a consumable device, or consumable C, 42 (e.g., a printer cartridge) configured to operate with the device 41 (e.g., a printer).

The consumable 42 is compatible with the device 41. According to one embodiment, the consumable 42 comprises an electronic authentication circuit 421. The electronic circuit 421 is an electronic device of the type of the electronic devices 20 and 30 described in relation with FIGS. 2 and 3. The device 421 can be particularly configured to authenticate the consumable 42 to the device 41 and to verify whether the consumable 42 is in fact compatible with the device 41. In some embodiments, the authentication circuit 421 may be in the device 41 and receive the key from the consumable 42, for example via one or more interfaces 73.

Various embodiments and variants have been described. Those skilled in the art will understand that certain features of these embodiments can be combined and other variants will readily occur to those skilled in the art.

In particular, the embodiments described in relation with FIGS. 2 and 3 can adapt to all types of electronic devices manipulating sensitive data. Furthermore, in the embodiments described in relation with FIGS. 2 and 3, the data stored in the read-only memory are encrypted and only require a single encryption key to be decrypted by the finite state machine. As a variant, the data stored in the read-only memory can be divided into several groups of data each encrypted by different algorithms, or by the same algorithm but with different encryption keys. The finite state machine could, in this case, receive several encryption keys from the user during the activation step.

Finally, the practical implementation of the embodiments and variants described herein is within the capabilities of those skilled in the art based on the functional description provided hereinabove, in particular regarding the encryption algorithms used to encrypt the data of the read-only memory.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, convolutional accelerators, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A printer cartridge including an electronic circuit, the electronic circuit comprising:
   an interface, which, in operation, receives a decryption key;
   a read-only memory in which encrypted data are stored; and
   cryptographic circuitry coupled to the interface, the cryptographic circuitry including a finite-state machine, wherein, in operation:
      the cryptographic circuitry protects the printer cartridge against reverse engineering attacks, the protecting including:
         supplying the decryption key to the finite-state machine via the interface during an activation phase to activate the printer cartridge for subsequent use and
         using, by the cryptographic circuitry, of the decryption key received via the interface to decrypt the encrypted data; and
      the electronic circuit performs one or more operations using the decrypted data, wherein, prior to the receipt of the decryption key, the decryption key is not stored in the printer cartridge and information from which the decryption key may be generated is not stored in the printer cartridge.

2. The printer cartridge according to claim 1 wherein the data are decrypted by the finite-state machine.

3. The printer cartridge according to claim 1, wherein the electronic circuit comprises a non-volatile memory.

4. The printer cartridge according to claim 1, wherein the electronic circuit comprises a volatile memory.

5. The printer cartridge according to claim 4 wherein the cryptographic circuitry, in operation, stores the decrypted data in the volatile memory.

6. The printer cartridge according to claim 5, wherein the electronic circuit comprises a non-volatile memory, wherein, in response to activation of the electronic circuit, the data stored in the volatile memory is stored in the non-volatile memory.

7. The printer cartridge according to claim 1 wherein the data are encrypted by an algorithm of the "Advanced Encryption Standard" (AES) type.

8. The printer cartridge of claim 1, comprising one or more processing cores, wherein the one or more operations include a start-up operation of the one or more processing cores.

9. A method, comprising:
   protecting a printer cartridge against reverse engineering attacks, the protecting including:
      receiving, by a finite-state machine of the printer cartridge in an activation phase to activate the printer cartridge for subsequent use, a decryption key via an interface of the printer cartridge;
      decrypting, using the decryption key, encrypted data stored in a read-only memory of the printer cartridge; and
      performing, by the printer cartridge, one or more operations using the decrypted data, wherein, prior to the receipt of the decryption key, the decryption key is not stored in the printer cartridge and information from which the decryption key may be generated is not stored in the printer cartridge.

10. The method of claim 9, comprising storing the decrypted data in a volatile memory of the printer cartridge.

11. The method of claim 9 wherein the one or more operations include a start-up operation of the printer cartridge.

12. The method of claim 9, comprising:
    coupling, via the interface, the printer cartridge to a printer; and
    receiving the decryption key via the interface from the printer, wherein the one or more operations comprise authenticating a compatibility of the printer cartridge and the printer.

13. The method according to claim 10, wherein the printer cartridge comprises a non-volatile memory, and the method comprises storing the decrypted data stored in the volatile memory into the non-volatile memory in response to activation of the printer cartridge.

14. A system, comprising:
    a first electronic device; and
    a second electronic device coupled to the first electronic device, the second electronic device including:
       a read-only memory in which encrypted data are stored; and
       cryptographic circuitry to protect the second electronic device from reverse engineering attacks and coupled to the read-only memory, wherein the cryptographic circuitry, in operation, uses a decryption key received from the first electronic device to decrypt the encrypted data, wherein, in operation, the second electronic device performs one or more operations using the decrypted data, wherein,
          the decryption key is received by a finite-state machine of the cryptographic circuitry during an activation phase to activate the second electronic device for subsequent use; and prior to the receipt of the decryption key, the decryption key is not stored in the second electronic circuit and information from which the decryption key may be generated is not stored in the second electronic circuit, wherein the first electronic device is a printer and the second electronic device is a printer cartridge.

15. The system of claim 14 wherein the one or more operations comprise authenticating a compatibility of the first and second electronic devices.

16. The system according to claim 14 wherein second electronic device comprises a volatile memory and the cryptographic circuitry, in operation, stores the decrypted data in the volatile memory.

17. The system according to claim 16, wherein the second electronic device comprises a non-volatile memory, wherein the data stored in the volatile memory is stored in the non-volatile memory to activate the second electronic device.

\* \* \* \* \*